United States Patent
Takahashi et al.

(10) Patent No.: US 10,621,711 B2
(45) Date of Patent: Apr. 14, 2020

(54) IMAGE PROCESSING DEVICE AND IMAGE PROCESSING METHOD FOR SYNTHESIZING PLURALITY OF IMAGES

(71) Applicant: SONY SEMICONDUCTOR SOLUTIONS CORPORATION, Kanagawa (JP)

(72) Inventors: Hiroaki Takahashi, Tokyo (JP); Kentaro Okamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 66 days.

(21) Appl. No.: 15/761,374

(22) PCT Filed: Sep. 16, 2016

(86) PCT No.: PCT/JP2016/077403
§ 371 (c)(1),
(2) Date: Mar. 19, 2018

(87) PCT Pub. No.: WO2017/057047
PCT Pub. Date: Apr. 6, 2017

(65) Prior Publication Data
US 2018/0268531 A1    Sep. 20, 2018

(30) Foreign Application Priority Data
Oct. 2, 2015   (JP) ................. 2015-197209

(51) Int. Cl.
*G06K 9/00* (2006.01)
*G06T 5/50* (2006.01)
(Continued)

(52) U.S. Cl.
CPC ............. *G06T 5/50* (2013.01); *G06T 7/593* (2017.01); *H04N 5/2258* (2013.01);
(Continued)

(58) Field of Classification Search
CPC . G06T 5/50; G06T 7/593; G06T 2207/20221; G06T 2207/10012; H04N 5/23232; H04N 2013/0088
See application file for complete search history.

(56) References Cited

U.S. PATENT DOCUMENTS 6,313,866 B1 * 11/2001 Akamatsu ............... G06F 3/011
  348/51
8,581,966 B2 * 11/2013 Chen .................. G02B 27/0093
  348/51
(Continued)

FOREIGN PATENT DOCUMENTS

CN      102422124 A    4/2012
EP       2501125 A1    9/2012
(Continued)

OTHER PUBLICATIONS

International Search Report and Written Opinion of PCT Application No. PCT/JP2016/077403, dated Dec. 13, 2016, 12 pages.

*Primary Examiner* — Amir Alavi
(74) *Attorney, Agent, or Firm* — Chip Law Group

(57) ABSTRACT

The present disclosure relates to an image processing device and an image processing method which are capable of improving the image quality using a plurality of images captured by a plurality of imaging units. The presence or absence of mutual parallax is determined using a main image including a low sensitivity high resolution image captured by a high resolution imaging unit and a sub image including a low resolution high sensitivity image captured by a high sensitivity imaging unit, and when there is parallax, similar pixels searched in the sub image are synthesized with respective pixels of the main image through a search synthesis process, and when there is no parallax, pixels at the same position are synthesized through an
(Continued)

optimal synthesis process. The present disclosure can be applied to an imaging device.

15 Claims, 15 Drawing Sheets

(51) Int. Cl.
*H04N 5/225* (2006.01)
*H04N 5/232* (2006.01)
*H04N 9/04* (2006.01)
*G06T 7/593* (2017.01)
*H04N 13/00* (2018.01)

(52) U.S. Cl.
CPC ..... *H04N 5/23229* (2013.01); *H04N 5/23232* (2013.01); *H04N 9/045* (2013.01); *G06T 2207/10012* (2013.01); *G06T 2207/10024* (2013.01); *G06T 2207/20221* (2013.01); *H04N 2013/0088* (2013.01)

(56) References Cited

U.S. PATENT DOCUMENTS

| | | | | |
|---|---|---|---|---|
| 9,049,367 | B2* | 6/2015 | Venkataraman | ............................. H01L 27/14618 348/218.1 |
| 9,055,181 | B2* | 6/2015 | Ogasahara | ............... H04N 9/09 |
| 9,109,891 | B2* | 8/2015 | Yamato | ................... G01C 11/06 |
| 9,154,765 | B2* | 10/2015 | Takama | ............. H04N 13/0018 |
| 9,961,272 | B2* | 5/2018 | Lee | ......................... H04N 5/247 |
| 10,291,899 | B2* | 5/2019 | Mikawa | ......................... H04N 13/156 |
| 10,334,161 | B2* | 6/2019 | Shoda | ................ H04N 5/23229 |
| 2008/0151042 | A1* | 6/2008 | Wang | ................ G02B 27/2242 348/49 |
| 2012/0062694 | A1 | 3/2012 | Muramatsu | |
| 2013/0100311 | A1 | 4/2013 | Ogasahara | |
| 2013/0258139 | A1 | 10/2013 | Omori | |
| 2013/0329074 | A1* | 12/2013 | Zhang | ................ H04N 5/2258 348/222.1 |
| 2013/0343636 | A1 | 12/2013 | Sato et al. | |
| 2018/0268531 | A1* | 9/2018 | Takahashi | ............... G06T 7/593 |

FOREIGN PATENT DOCUMENTS

| | | |
|---|---|---|
| JP | 2004-328137 A | 11/2004 |
| JP | 2006-072757 A | 3/2006 |
| JP | 2010-147786 A | 7/2010 |
| JP | 2010-157863 A | 7/2010 |
| JP | 2011-254170 A | 12/2011 |
| JP | 2012-124622 A | 6/2012 |
| JP | 2013-092552 A | 5/2013 |
| JP | 2014-026641 A | 2/2014 |

\* cited by examiner

IMAGE PROCESSING DEVICE AND IMAGE PROCESSING METHOD FOR SYNTHESIZING PLURALITY OF IMAGES

CROSS REFERENCE TO RELATED APPLICATIONS

This application is a U.S. National Phase of International Patent Application No. PCT/JP2016/077403 filed on Sep. 16, 2016, which claims priority benefit of Japanese Patent Application No. JP 2015-197209 filed in the Japan Patent Office on Oct. 2, 2015. Each of the above-referenced applications is hereby incorporated herein by reference in its entirety.

TECHNICAL FIELD

The present disclosure relates to an image processing device, an image processing method, and a program, and more particularly, to an image processing device, an image processing method, and a program which are capable of implementing a high quality image by synthesizing images captured through a plurality of imaging systems.

BACKGROUND ART

Techniques of synthesizing images captured by a compound eye camera including a plurality of different imaging systems and implementing a high image quality have been proposed (see Patent Literatures 1 and 2).

CITATION LIST

Patent Literature

Patent Literature 1: JP 2004-328137A
Patent Literature 2: JP 2010-157863A

DISCLOSURE OF INVENTION

Technical Problem

However, in the existing techniques represented by Patent Literatures 1 and 2 described above, the synthesis is performed in a state in which parallax between different imaging systems is ignored.

Since the parallax varies in accordance with a distance of a subject from an imaging system, in order to obtain the parallax for each pixel accurately, a high cost is required, and synthesis of a plurality of images in a state in which there is parallax is likely to lead to an artifact or a false color.

The present disclosure was made in light of the foregoing, and more particularly, makes it possible to implement a high quality image by synthesizing images captured by a plurality of imaging systems in view of parallax.

Solution to Problem

An image processing device according to an aspect of the present disclosure includes: a first imaging unit configured to capture a first image; a second imaging unit configured to capture a second image; a parallax determining unit configured to determine whether there is parallax between the first image and the second image; and a synthesizing unit configured to synthesize respective pixels of the first image and the second image in accordance with a determination result of the parallax determining unit.

The first imaging unit and the second imaging unit can be on a same plane, and optical axes of the first imaging unit and the second imaging unit can be parallel.

The first image and the second image can have different image characteristics.

The first image and the second image can be different in the image characteristic of at least one of a number of pixels, an angle of view, a wavelength band, and a color filter array.

The parallax amount determining unit can determine whether there is parallax in units of pixels of the first image and the second image or in units of regions divided into a plurality of regions including a plurality of pixels.

In a case in which the parallax determining unit determines that there is no parallax, the synthesizing unit can synthesize pixels of the first image and the second image at corresponding positions, and in a case in which the parallax determining unit determines that there is parallax, the synthesizing unit can search for pixels in the second image similar to respective pixels of the first image and synthesize the respective pixels with the searched pixels.

A characteristic adjusting unit configured to adjust characteristics of the first image and the second image to make the characteristics coincide with each other can be further included. The parallax determining unit can determine whether there is parallax for the first image and the second image whose characteristics are adjusted to coincide with each other by the characteristic adjusting unit.

The characteristic adjusting unit can perform adjustment so that the first image and the second image coincide in at least one of a resolution, a sensitivity, a spatial frequency characteristic, a direction of an optical axis, and a parallelization process of correcting lens distortion.

A parallel moving unit configured to cause the second image to move parallel relative to the first image to reduce parallax can be further included. The parallel moving unit can cause the entire second image to move parallel or cause the second image to move parallel in units of pixels to reduce the parallax.

The parallel moving unit can cause the entire second image to move parallel or cause the second image to move parallel in units of pixels by a parallax amount obtained in accordance with a distance from the first imaging unit to the focal plane and an arrangement, optical characteristics, and resolutions of the first imaging unit and the second imaging unit, a parallax amount obtained with reference to a table preset from a setting value obtained by adjusting a focal distance of the first imaging unit, a parallax amount obtained as a deviation between common feature points of the first image and the second image, a parallax amount obtained in accordance with a depth when a depth map corresponding to each of the first image and the second image is given, or a preset predetermined parallax amount.

An image processing method according to an aspect of the present disclosure includes steps of: capturing a first image; capturing a second image; determining whether there is parallax between the first image and the second image; and synthesizing respective pixels of the first image and the second image in accordance with a determination result of the parallax.

A program according to an aspect of the present disclosure causes a computer to function as: a first imaging unit configured to capture a first image; a second imaging unit configured to capture a second image; a parallax determining unit configured to determine whether there is parallax between the first image and the second image; and a synthesizing unit configured to synthesize respective pixels of the first image and the second image in accordance with a determination result of the parallax determining unit.

In an aspect of the present disclosure, a first image is captured; a second image is captured; it is determined whether there is parallax between the first image and the second image; and respective pixels of the first image and the second image are synthesized in accordance with a determination result of whether there is parallax.

Advantageous Effects of Invention

According to an aspect of the present disclosure, since two images can be appropriately synthesized in accordance with parallax, it is possible to implement an appropriate high image quality by imaging the same range through a plurality of imaging units and performing synthesis such as superimposition.

MODE(S) FOR CARRYING OUT THE INVENTION

Figure 1:
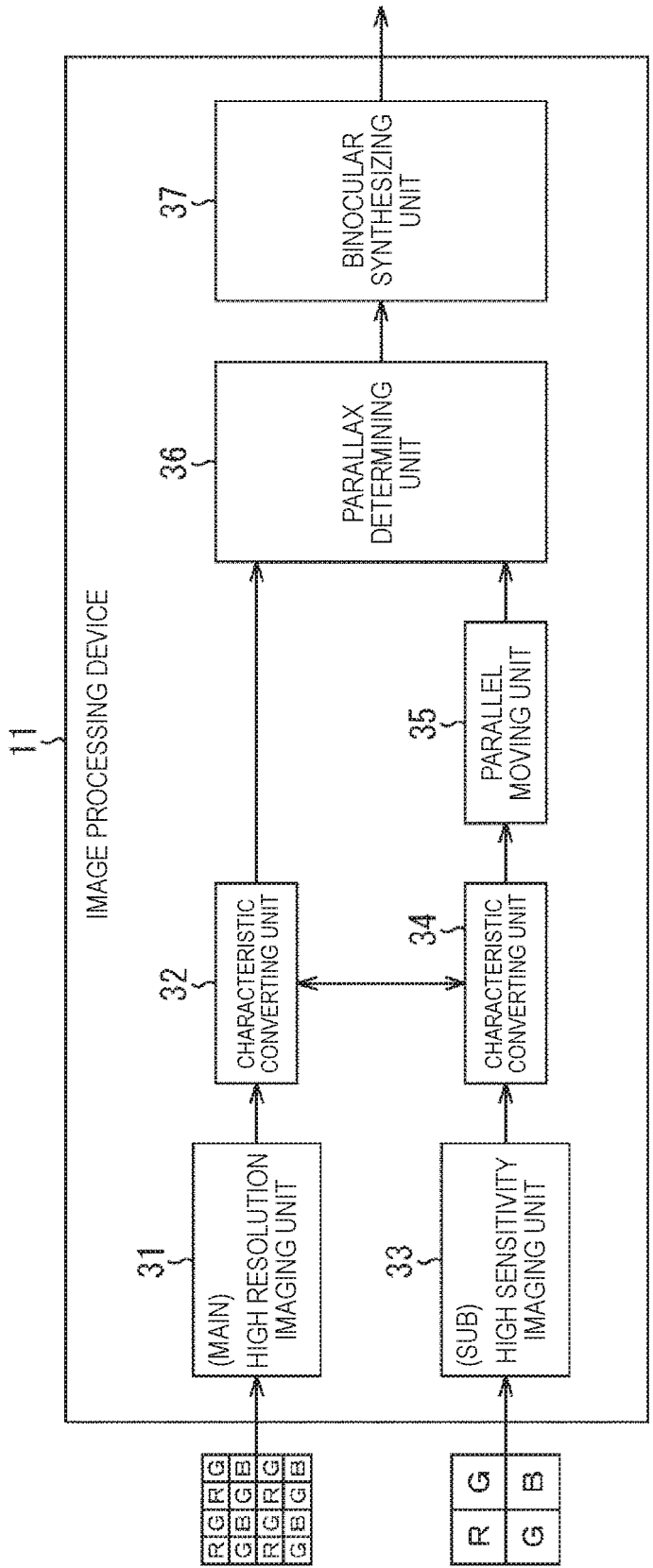
FIG. 1 is a diagram for describing a configuration example of an image processing device to which the present disclosure is applied.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Embodiment of present disclosure
2. First application example
3. Second application example 1. Embodiment of Present Disclosure <Configuration Example of Image Processing Device>

FIG. 1 illustrates a configuration example of an embodiment of an image processing device that synthesizes (superimposes) images captured by a plurality of imaging systems and implements a high quality image to which the present disclosure is applied.

An image processing device 11 of FIG. 1 includes a high resolution imaging unit 31, a characteristic converting unit 32, a high sensitivity imaging unit 33, a characteristic converting unit 34, a parallel moving unit 35, a parallax determining unit 36, and a binocular synthesizing unit 37.

The high resolution imaging unit 31 and the high sensitivity imaging unit 33 including, for example, a complementary metal oxide semiconductor (CMOS) image sensor, or the like are disposed on the same plane in an imaging direction with parallel optical axes. The high resolution imaging unit 31 captures an image of a Bayer array illustrated in the upper left part of FIG. 1 and supplies the image to the characteristic converting unit 32. On the other hand, the high sensitivity imaging unit 33 similarly captures an image of a Bayer array illustrated in the lower left part of FIG. 1 and supplies the image to the characteristic converting unit 32.

The image captured by the high resolution imaging unit 31 is a high resolution image but a low sensitivity image as compared with the image captured by the high sensitivity imaging unit 33. On the other hand, the image captured by the high sensitivity imaging unit 33 is a high sensitivity image but a low resolution image as compared with the image captured by the high resolution imaging unit 31. Further, the high resolution imaging unit 31 and the high sensitivity imaging unit 33 are disposed on the same plane so that their respective optical axes are parallel.

Here, the following description will proceed with an example in which the image captured by the high resolution imaging unit 31 is converted into a high quality image using the image captured by the high sensitivity imaging unit 33. In this regard, since the image captured by the high resolution imaging unit 31 is used as a reference, hereinafter, the image captured by the high resolution imaging unit 31 is also referred to as a "main image," and similarly, the image captured by the high sensitivity imaging unit 34 is also referred to as a "sub image."

The characteristic converting units 32 and 34 compare an image characteristic of the main image of the high resolution captured by the high resolution imaging unit 31 and an image characteristic of the sub image of the high sensitivity captured by the high sensitivity imaging unit 33 with each other, and in a case in which the image characteristic of the high resolution main image does not coincide with the image characteristic of the high sensitivity sub image, the images are converted so that their image characteristics coincide with each other and then output to the parallax determining unit 36. In this case, since the resolution of the main image and the resolution of the sub image are different, and the main image has a higher resolution, the characteristic converting unit 32 causes the main image of the high resolution to coincide with the sub image of the low resolution by decreasing the resolution of the main image of high resolution. Further, since the main image is an image with a lower sensitivity than the sub image, the characteristic converting unit 32 adjusts the sensitivity of the main image to coincide with the sensitivity of the sub image. Further, the characteristic converting units 32 and 34 also perform parallelization for compensating for optical characteristics, assembly variations, and the like of the high resolution imaging unit 31 and the high sensitivity imaging unit 33. Here, in a case in which the characteristic of the main image coincides with the characteristic of the sub image already, the characteristic converting units 32 and 34 do not perform any process.

In a case in which it is possible to acquire information of a parallax amount arising from the optical characteristics or the like of the high resolution imaging unit 31 and the high sensitivity imaging unit 33 which is known in advance, the parallel moving unit 35 causes the main image and the sub image to move parallel in a direction in which the parallax amount is corrected. Here, since the information of the parallax amount including the optical characteristics or the like of the high resolution imaging unit 31 and the high sensitivity imaging unit 33 may not necessarily be acquired, the parallel moving unit 35 causes one of the main image and the sub image to move parallel on the basis of a position of the other image using the information of the parallax amount only when it is possible to acquire the information of the parallax amount.

The parallax determining unit 36 obtains the parallax amount and adjusts the synthesis method in order to switch a technique of synthesizing the main image and the sub image to be described later. In other words, if pixels having the parallax between the main image and the sub image are synthesized, it causes an artifact or a false color. For this reason, the parallax determining unit 36 determines the synthesis method in accordance with the parallax amount, and supplies the synthesis method serving as the determination result to the binocular synthesizing unit 37.

The binocular synthesizing unit 37 synthesizes the main image and the sub image whose characteristics coincide with each other so that the main image and the sub image are superimposed using the synthesis method specified on the basis of the determination result of the parallax determining unit 36, and outputs the synthesized image.

<Image Synthesis Process Performed by Image Processing Device of FIG. 1>

Next, an image synthesis process for synthesizing images through the image processing device 11 of FIG. 1 will be described with reference to a flowchart of FIG. 2.

In step S11, the high resolution imaging unit 31 and the high sensitivity imaging unit 33 capture the main image and the sub image, respectively, and output the main image and the sub image to the characteristic converting units 32 and 34, respectively.

In step S12, the characteristic converting units 32 and 34 compare the image characteristic of the input main image and the image characteristic of the sub image with each other and determine whether or not the image characteristics are different. In step S12, in this example, the main image has a higher resolution than the sub image and the characteristics are different, and thus the process proceeds to step S13.

In step S13, the characteristic converting units 32 and 34 adjust the image characteristics of the main image and the image characteristics of the sub image to make them coincide with each other. Then, the characteristic converting unit 32 supplies the main image having the adjusted characteristic to the parallax determining unit 36. Further, the characteristic converting unit 34 supplies the sub image to the parallel moving unit 35. Examples of the characteristic to be adjusted include resolutions, sensitivities, spatial frequency characteristics, and directions of the optical axes of the main image and sub image, a parallelization process of lens distortion, and the like.

More specifically, since the main image has a higher resolution and a lower sensitivity than the sub image here, the characteristic converting unit 32 causes the characteristic of the main image and the characteristic of the sub image to coincide with each other by causing the resolution of the main image to coincide with the resolution of the sub image and adjusting the sensitivity of the main image to the sensitivity of the sub image. In addition, the characteristic converting units 32 and 34 parallelize the main image and the sub image in order to compensate for the optical characteristics, the assembly variations, and the like of the high resolution imaging unit 31 and the high sensitivity imaging unit 33. Here, an example of causing the resolution of the main image to coincide with the resolution of the sub image will be described, but it is possible to upsample the sub image, generate a high resolution image, and cause the resolution of the sub image to coincide with the resolution of the main image.

Here, in a case in which the image characteristic of the main image and the image characteristic of the sub image coincide with each other in step S11, the process of step S12 is skipped.

In step S14, the parallel moving unit 35 determines whether or not it is possible to acquire information (information such as a lens focal distance) from which the parallax amount including the optical characteristics or the like of the high resolution imaging unit 31 and the high sensitivity imaging unit 33 can be obtained. In a case in which information necessary for obtaining the parallax amount such as the optical characteristics of the high resolution imaging unit 31 and the high sensitivity imaging unit 33 is input in advance or it is possible to acquire information necessary for obtaining the parallax amount through communication or the like from the high resolution imaging unit 31 and the high sensitivity imaging unit 33, the process proceeds to step S15.

In step S15, the parallel moving unit 35 causes the sub image to move parallel using the information of the parallax amount using the main image as the reference position.

Figure 3:
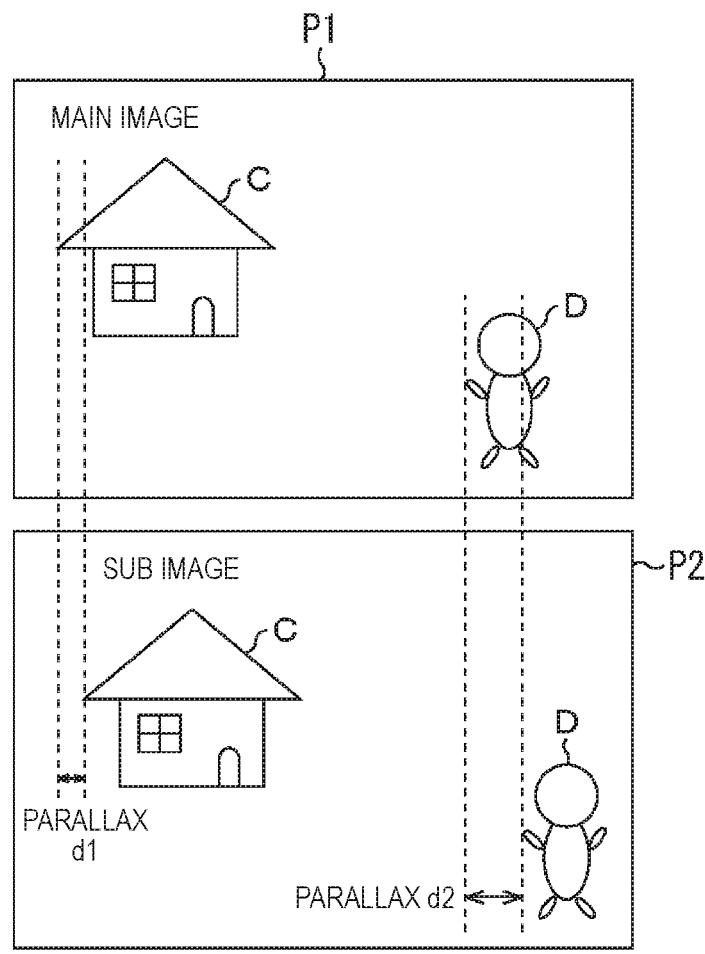
FIG. 3 is a diagram for describing parallax.
Figure 4:
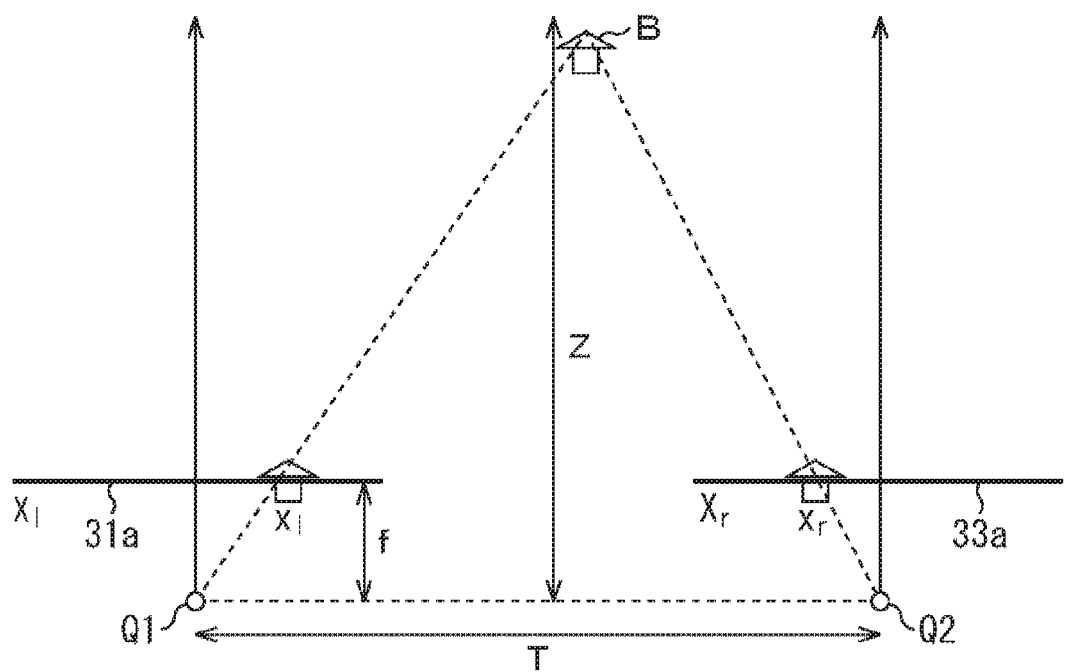
FIG. 4 is a diagram for describing a method of obtaining a parallax amount.

In other words, in a case in which imaging is performed with a binocular camera including the high resolution imaging unit 31 and the high sensitivity imaging unit 33, parallax occurs between a main image P1 and a sub image P2 as illustrated in FIG. 3. The parallax amount may differ depending on a distance of a region of interest from an imaging position, that is, a depth, and for example, in the example of FIG. 3, in a case in which left end portions of houses C in left portions of the main image P1 and the sub image P2 are set as a region of interest, the parallax is parallax d1, but in a case in which left end portions of persons D in right portions are set as a region of interest, the parallax is parallax d2. This is because the house C is located at a position farther than the person D when viewed from the imaging positions of the high resolution imaging unit 31 and the high sensitivity imaging unit 33.

More specifically, in a case in which the high resolution imaging unit 31 and the high sensitivity imaging unit 33 are installed on the same plane in the horizontal direction, images of a subject captured by the high resolution imaging unit 31 and the high sensitivity imaging unit 33 are formed at a position x_1 on an image sensor 31a of the high resolution imaging unit 31 and a position x_r on an image sensor 33a of the high sensitivity imaging unit 33. A position deviation at this time appears as parallax, and a parallax amount δ(=x_1−x_r) is indicated by the following Formula (1). Here, in FIG. 3, a line of sight direction of the high resolution imaging unit 31 including the image sensor 31a is indicated by Q1, and a line of sight direction of the high sensitivity imaging unit 33 including the image sensor 33a is indicated by Q2.

[Math. 1]

$$\delta = \frac{f \times T}{Z} \quad (1)$$

Here, δ indicates a parallax amount, f indicates a focal distance of a lens, T indicates a distance between the imaging systems, and Z indicates a distance to the subject, and units of all the variables are [mm].

In a case in which a pixel pitch in the image sensors 31a and 33a of the high resolution imaging unit 31 and the high sensitivity imaging unit 33 is p[mm/pixel], parallax δ_p [pixel] in an image is indicated by Formula (2).

[Math. 2]

$$\delta_p = \delta/p \quad (2)$$

Figure 5:
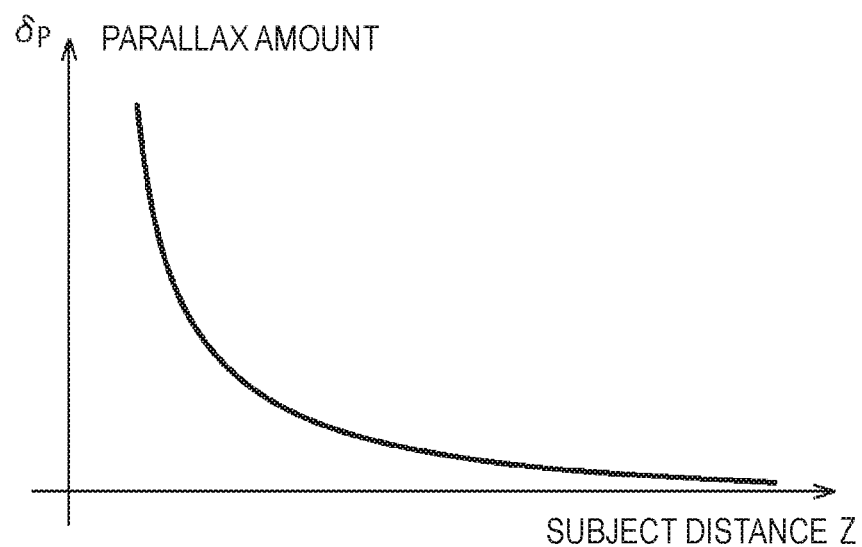
FIG. 5 is a diagram for describing a relation between a subject distance and a parallax amount.

FIG. 5 illustrates a relation of Formula (2), and if the focal distance f and the distance T between the imaging systems are invariable, the parallax amount δ is inversely proportional to the distance to the subject.

For example, in a case in which a predetermined subject is focused and the distance to that subject is known, it is possible to obtain the parallax amount on the image from Formulas (1) and (2). In this regard, the parallel moving unit 35 obtains the parallax amount from Formulas (1) and (2), and causes the parallax between the main image and the sub image of the subject existing at a depth of a focus position to be zero (0) by causing the sub image to move parallel relative to the main image by the obtained parallax amount δ.

In a case in which there is no information for obtaining the parallax amount in step S14, the process of step S15 is skipped, and the parallel moving unit 35 outputs the sub image to the parallax determining unit 36 without change without causing the sub image to move parallel. Further, even in a case in which the information for obtaining the parallax amount is unable to be obtained directly, for example, the parallax amount may be obtained on the basis of infinity, and the parallel movement may be performed. Further, the example in which the entire image is moved parallel has been described above, but the parallel movement may be performed in units of pixels.

Here, as described above, the parallel movement may be performed in accordance with the parallax amount obtained in accordance with the distance to the focal plane and the arrangement, the optical characteristics, and the resolutions of the high resolution imaging unit 31 and the high sensitivity imaging unit 33, but any other technique may be employed as long as the parallel movement can be performed.

For example, the parallel movement may be performed by the parallax amount obtained with reference to a table which is set in advance from a setting value obtained by adjusting the focal distance of the high resolution imaging unit 31. Further, the parallel movement may be performed by the parallax amount obtained as a deviation between common feature points of the main image and the sub image. Further, in a case in which depth maps corresponding to the main image and the sub image are given, the parallel movement may be performed by the parallax amount obtained in accordance with the depth, or the parallel movement may be performed by a predetermined parallax amount set in advance.

In step S16, since a subsequent process is performed in units of pixels, the parallax determining unit 36 sets any one of unprocessed pixels as a pixel of interest serving as a processing target for respective corresponding pixel positions of the main image and the sub image.

In step S17, the parallax determining unit 36 executes a determination value calculation process and calculates a determination value a in units of pixels necessary for determining a synthesis method of the main pixel and the sub pixel in units of pixels.

<Determination Value Calculation Process>

Figure 6:
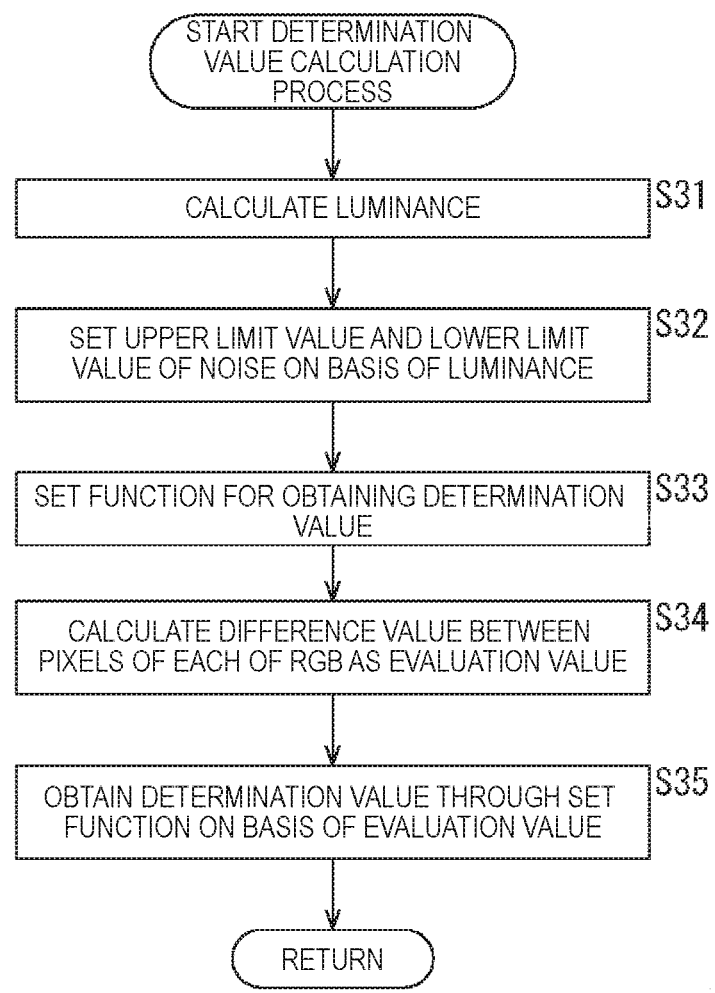
FIG. 6 is a flowchart illustrating a determination value calculation process of FIG. 2.

The determination value calculation process for calculating the determination value α will now be described with reference to a flowchart of FIG. 6.

In step S31, the parallax determining unit 36 calculates a luminance value of a pixel of interest for each of the main image and the sub image.

[Math. 3]

$$L = (R + 2 \times G + B)/4.0 \quad (3)$$

Here, RGB indicates an interpolation pixel value of each of RGB at the pixel position of the pixel of interest, and L indicates a luminance value.

In step S32, the parallax determining unit 36 sets an upper limit value and a lower limit value of noise from the characteristics of the high resolution imaging unit 31 and the high sensitivity imaging unit 33 using the luminance values obtained for the main image and the sub image.

In step S33, the parallax determining unit 36 sets a function for determining the determination value on the basis of the upper limit value and the lower limit value of the noise. Here, the function for determining the determination value is, for example, a function illustrated in FIG. 7. In a graph of FIG. 7, a horizontal axis indicates an evaluation value E of the noise, and a vertical axis indicates the determination value α. Here, threshold values th1 and th2 in the evaluation value of the noise are the lower limit value and the upper limit value of the noise. When a difference between pixels of RGB in the pixel of interest in the main image and the sub image obtained by a process to be described later is smaller than the lower limit value of the noise level, the determination value α is set to 0, and when the RGB difference is larger than the upper limit value, the determination value α is set to 1, and when the RGB difference is between the lower limit value and the upper limit value, the determination value α is set to a value of 0 to 1 according to a difference between pixels.

In step S34, the parallax determining unit 36 calculates a difference value between pixels of each of RGB in the pixel of interest in the main image and the sub image and calculates a maximum value thereof as an evaluation value E. In other words, when the pixel value of RGB in the pixel of interest in the main image is (Rm, Gm, Bm), and the pixel value of RGB in the pixel of interest in the sub image is (Rs, Gs, Bs), (|Rm−Rs|, |Gm−Gs|, |Bm−Bs|) is calculated as the difference value between pixels, and a maximum value thereof is calculated as the evaluation value E. Here, for example, an average value may be calculated as the evaluation value E instead of the maximum value of the difference value between pixels (|Rm−Rs|, |Gm−Gs|, |Bm−Bs|) as long as the difference between pixels at the same position of the main image and the sub image is obtained.

In step S35, the parallax determining unit 36 obtains the determination value a corresponding to evaluation value E in the function set in step S33 as the determination value of the pixel of interest.

Figure 7:
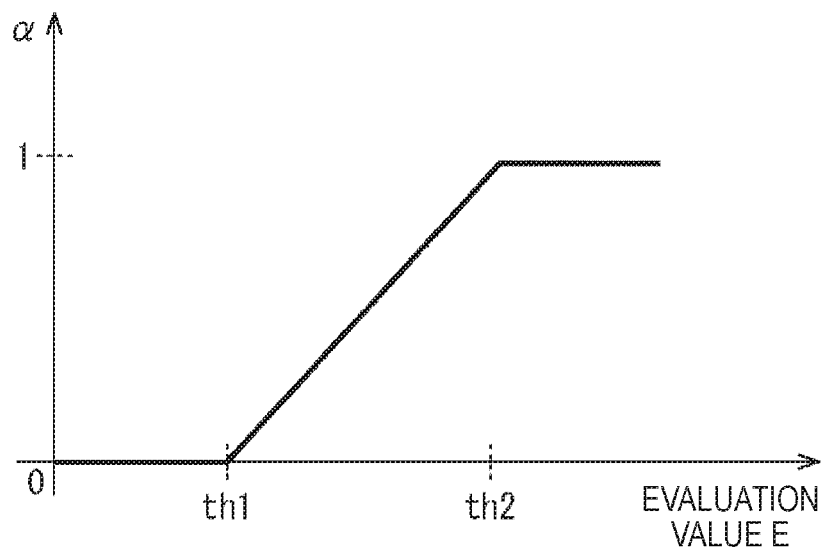
FIG. 7 is a diagram for describing a relation between an evaluation value and a determination value.

In other words, as illustrated in FIG. 7, if the evaluation value E is smaller than the lower limit value th1 of the estimated noise by the difference, it is determined to be a region in which there is no parallax between the main image and the sub image in the pixel of interest, and the determination value α is set to 0. Further, in a case in which the evaluation value E is between the lower limit value th1 and the upper limit value th2 of the noise, the determination value a is set to a value of 0 to 1 corresponding to the evaluation value. Further, if the evaluation value E is larger than the upper limit value th2 of the noise, it is determined to be a region in which there is parallax between the main image and the sub image in the pixel of interest, and the determination value α is set to 1.

Figure 2:
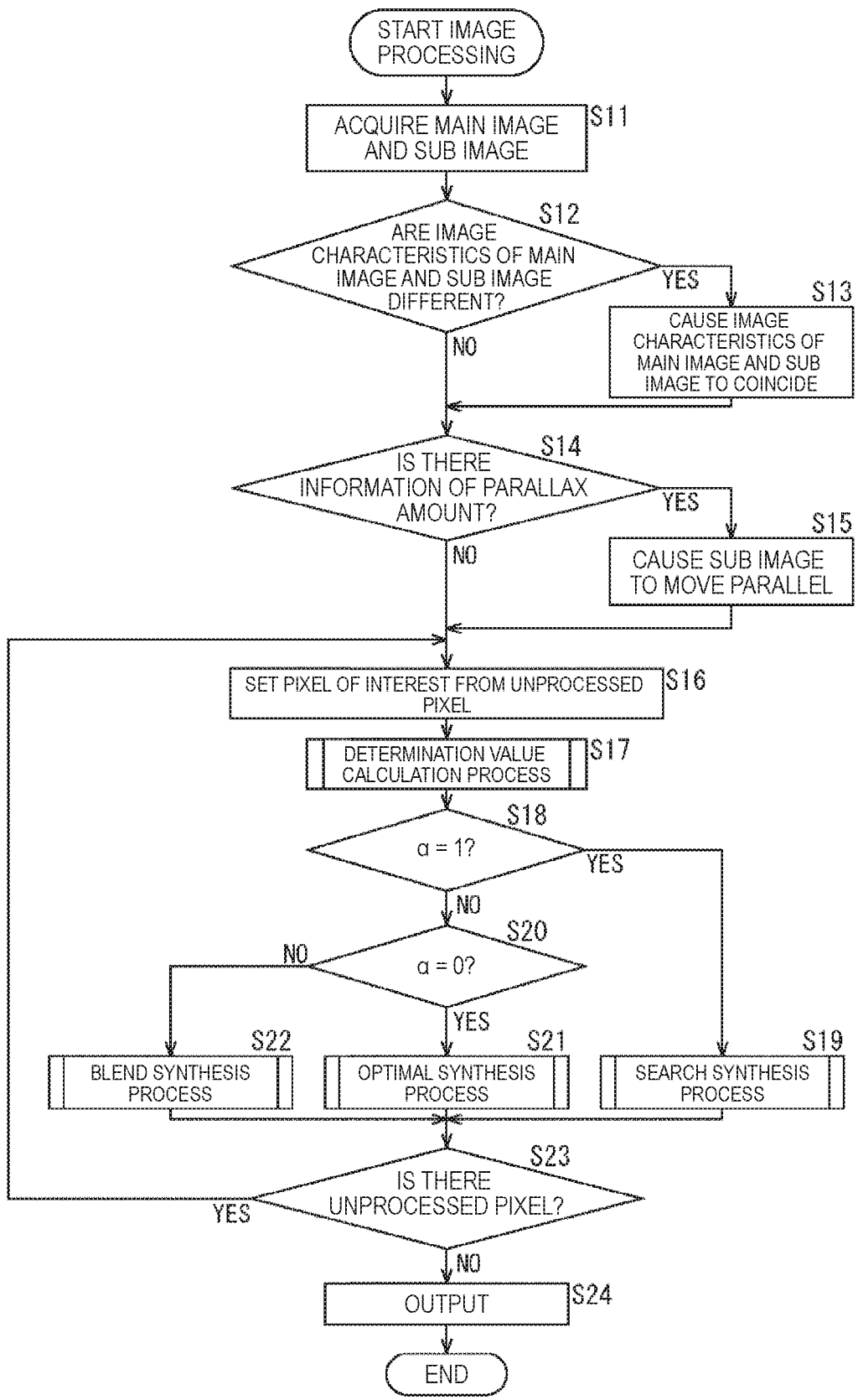
FIG. 2 is a flowchart illustrating image processing performed by the image processing device of FIG. 1.

Here, the description returns to the flowchart of FIG. 2.

If the determination value α for determining the synthesis method is obtained in step S17, in step S18, the parallax determining unit 36 determines whether or not the determination value a is 1. If the determination value α is 1 in step S18, the process proceeds to step S19.

In step S19, the parallax determining unit 36 performs search synthesis on the pixel method of the pixel of interest, supplies the searched synthesis method to the binocular synthesizing unit 37 so that the search synthesis process is executed to synthesize the pixel of interest.

In other words, when the determination value α is 1, it means that the pixel values of the pixels at the same position in the main image and the sub image are greatly different, they are not considered to be the same pixel, and the parallax is considered to occur. In this regard, the search synthesis process of searching for the same pixel as the pixel of interest in the main image from the sub image and synthesizing the pixel of interest with the searched pixel is selected. The search synthesis process will be described later in detail.

Further, in a case in which the determination value α is not 1 in step S18, the process proceeds to step S20.

In step S20, the parallax determining unit 36 determines whether or not the determination value α is 0, and in a case in which the determination value α is 0, the process proceeds to step S21.

In step S21, the parallax determining unit 36 sets optimal synthesis as the synthesis method of the pixel of interest, supplies the optical synthesis to the binocular synthesizing unit 37 so that the optimal synthesis process is executed to synthesize the pixel of interest.

In other words, when the determination value α is 0, it means that the pixel values of the pixels at the same position in the main image and the sub image are regarded as being substantially equal, and no parallax is considered to occur. In this regard, an optimal synthesis process of synthesizing the pixel of the sub image at the same position as the pixel of interest in the main image is selected. Here, the optimal synthesis process will be described later in detail.

In a case in which the determination value α is not 0 in step S20, that is, in a case in which the determination value α is 0<α<1, the process proceeds to step S22.

In step S22, the parallax determining unit 36 sets blend synthesis of blending the search synthesis and the optimal synthesis using the determination value α as the synthesis method of the pixel of interest, and supplies the blend synthesis to the binocular synthesizing unit 37 so that the blend synthesis process is executed to synthesize the pixel of interest.

In other words, when the determination value α is within the range of 0 to 1, the parallax is suspected to occur since the pixel of interest in the main image is not identical to the pixel of the sub image at the same position, but it is a pixel which has a relatively close pixel value, and it is unable to be determined whether the difference is parallax or noise. In this regard, the blend synthesis process of blending a search synthesis pixel and an optimal synthesis pixel in accordance with the determination value a. The blend synthesis process will be described later in detail.

In other words, the synthesis method is set in accordance with the value of the determination value α, and the pixels are synthesized by the set synthesis method.

In step S23, the parallax determining unit 36 determines whether or not there is an unprocessed pixel, and when there is an unprocessed pixel, the process returns to step S16. In other words, a similar process is repeated as the process of steps S16 to S23 until all the pixels are synthesized. Then, in a case in which all the pixels are synthesized and there is no unprocessed pixel in step S23, the process proceeds to step S24.

In step S24, the binocular synthesizing unit 37 outputs a synthetic image including pixels obtained by synthesizing the main image and the sub image, and the process ends.

With the above process, it is possible to synthesize the main image and the sub image.

<Search Synthesis Process in Image Processing Device of FIG. 1>

Figure 8:
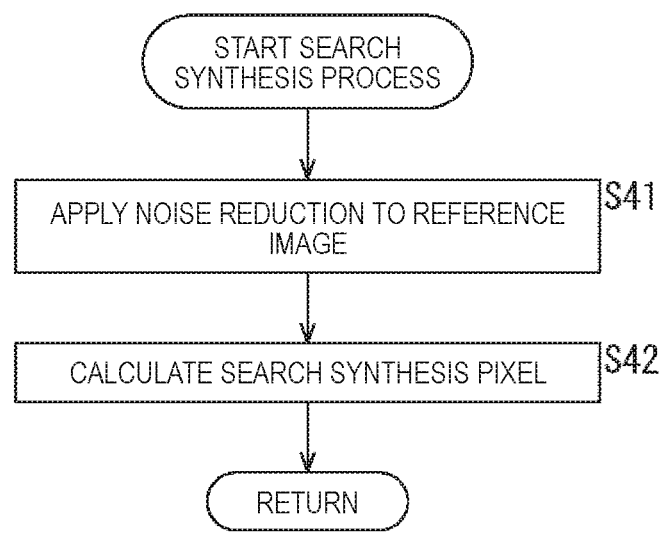
FIG. 8 is a flowchart illustrating a search synthesis process of FIG. 2.

Next, the search synthesis process will be described with reference to the flowchart of FIG. 8.

In step S41, in order to improve a signal to noise ratio (SNR) of the main image, the binocular synthesizing unit 37 searches for a predetermined range centering on the pixel of interest, for example, a range of 3×3 pixels and applies noise reduction. More specifically, a filter process indicated by the following Formula (4) is applied.

[Math. 4]

$$P_{ref}^m = \left\{ \sum_i \sum_j P_{i,j}^m \exp\left(-\frac{(P_{m,n}^m - P_{i,j}^m)^2}{2\sigma^2}\right) \right\} / \left\{ \sum_i \sum_j \exp\left(-\frac{(P_{m,n}^m - P_{i,j}^m)^2}{2\sigma^2}\right) \right\} \quad (4)$$

Here, $P_{m,n}^m$ indicates a pixel signal of a pixel of interest (m, n) in the main image, σ indicates a noise estimation value, and $P_{ref}^m$ indicates a new reference signal (the pixel signal of the pixel of interest).

Figure 9:
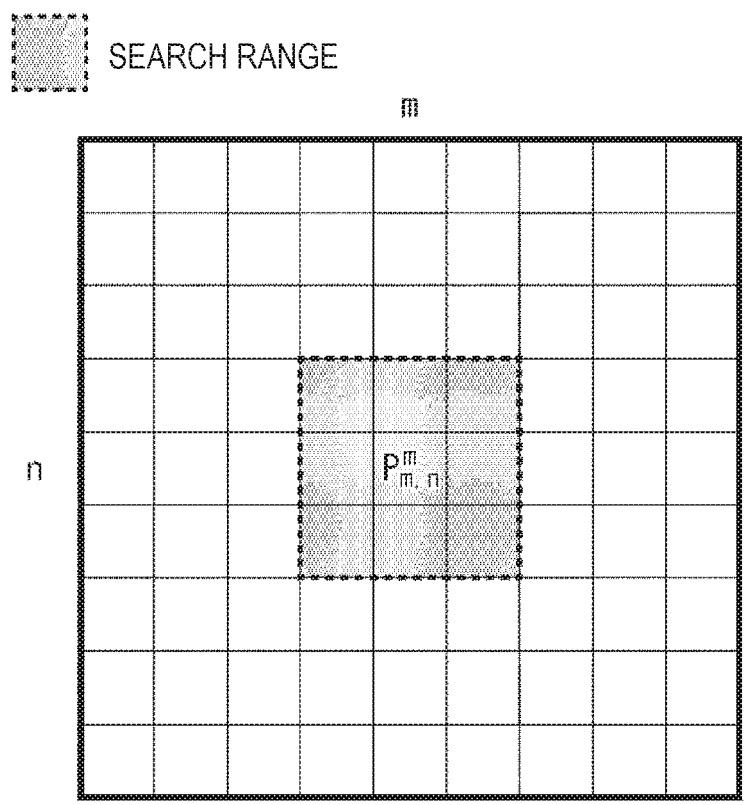
FIG. 9 is a diagram for describing a search synthesis process.

The process indicated by Formula (4) is a process of applying an ε filter process to the range of 3×3 pixels surrounded by a dotted line corresponding to the pixel of interest $P_{m,n}^m$ of the main image, for example, as illustrated in FIG. 9.

In step S42, the binocular synthesizing unit 37 sets the pixel signal of the pixel of interest of the main image as a reference pixel signal, searches for a pixel signal similar to the reference pixel signal in the sub image, synthesizes the pixel signal of the searched pixel with the reference pixel signal which is the pixel signal of the pixel of interest of the main image, and outputs the search synthesis pixel. More specifically, the search synthesis pixel is obtained by a calculation indicated by the following Formula (5).

[Math. 5]

$$P_{out} = \left\{ P_{ref}^m + \sum_i \sum_j P_{m,n}^s \exp\left(-\frac{(P_{ref}^m - P_{i,j}^s)^2}{2\sigma^2}\right) \right\} / \left\{ 1 + \sum_i \sum_j \exp\left(-\frac{(P_{ref}^m - P_{i,j}^s)^2}{2\sigma^2}\right) \right\} \quad (5)$$

Here, $P_{m,n}^S$ indicates a pixel signal of a pixel (m, n) in the sub image, σ indicates a noise estimation value, and $P_{out}$ indicates the pixel signal of the search synthesis pixel.

In other words, the search synthesis process is a process of setting the pixel of the main image as the reference pixel signal, obtains a degree of similarity between the reference pixel signal and the pixel signal in the sub image similar to the reference pixel signal, searches for the pixel signal in the sub image similar to the reference pixel signal, and synthesizing the pixel of the sub image similar to the searched the pixel of interest with the pixel signal of the pixel of interest of the main image. Here, examples of the degree of similarity used in the search include a weighted average corresponding to a weight of a degree of similarity between pixels and a difference absolute value sum between corresponding pixels in the range of 3×3 pixels centering on the pixel of interest.

When such a synthesis process is performed, it is possible to apply the noise reduction to the main image. If the signal of the sub image has higher sensitivity, the high noise reduction effect can be expected.

The criterion for determining the pixel signal similar to the pixel signal of the pixel of interest in the main image is the same technique as in the process of obtaining the evaluation value in the parallax determining unit, and first, the value of the noise is estimated, and significance is determined by comparing the estimated value of the noise with the difference signal between the reference pixel signal and the pixel of the sub image.

In a case in which the sub image with parallax is synthesized as the same pixel, since there is a high possibility that an artifact or a false color is likely to occur, the characteristics of the optical systems of the high resolution imaging unit 31 and the high sensitivity imaging unit 33 are adjusted so that the noise estimate value is calculated to be small so that the pixel of the sub image with parallax is not easily synthesized.

In a case in which a sensitivity difference between the main image and the sub image is remarkably large, the reference pixel signal includes a relatively large amount of noise, and it is difficult to determine whether or not the true values of the reference pixel signal and each pixel of the sub image are identical. In this regard, in order to improve the SNR of the main image through the process of step S41, only the main pixels are searched within the range of 3×3, and the noise reduction is performed as preprocessing.

Here, an initial position of the search in the sub image in which the pixel similar to the pixel of interest is searched for may be the same coordinates as the main image, or a position shifted by a predetermined value may be set as the initial position. As the predetermined value, the above-mentioned parallax amount calculated to cause the parallax to be 0 on a focus plane or a parallax amount of a position corresponding to a feature point common to both of the main image and the sub image (the same pixel position of a common object) may be used.

Figure 10:
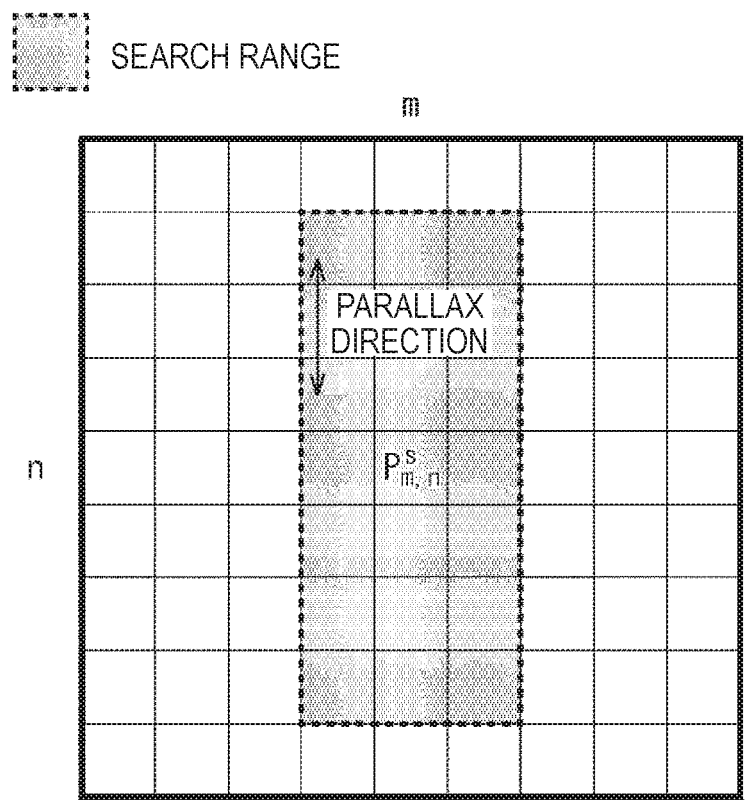
FIG. 10 is a diagram for describing a search range when parallax occurs in a vertical direction.
Figure 11:
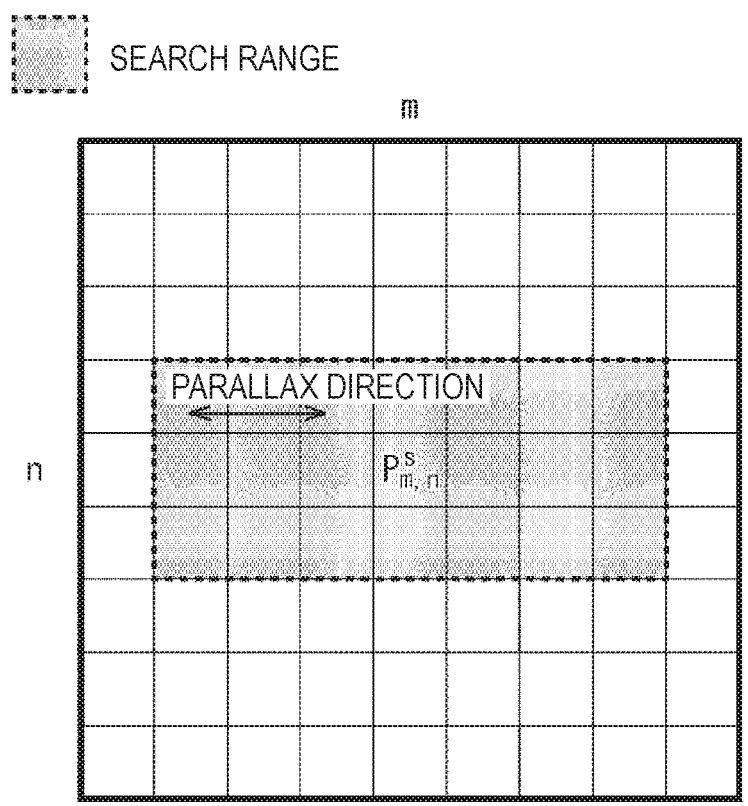
FIG. 11 is a diagram for describing a search range when parallax occurs in a horizontal direction.

Further, at this time, the search range for the sub image may be adjusted in the vertical direction and the horizontal direction using a parameter, and for example, if there is the parallax in the vertical direction, the search range in the vertical direction is increased as indicated by a range surrounded by a dotted line of FIG. 10, and if there is the parallax in the horizontal direction, the search range in the horizontal direction is increased as indicated by a range surrounded by a dotted line of FIG. 11, and thus it is possible to implement the effective search, and it is possible to suppress a computational amount.

<Optimal Synthesis Process Performed by Image Processing Device of FIG. 1>

Figure 12:
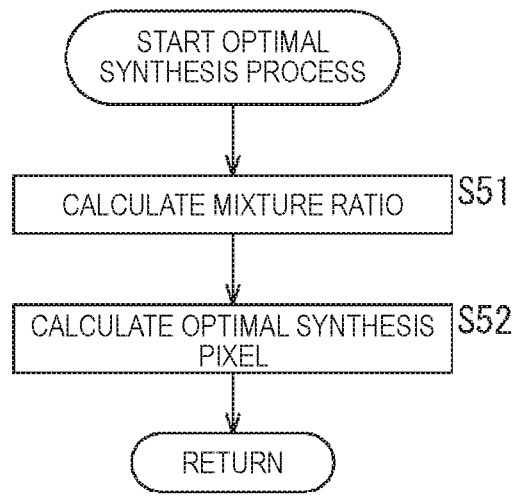
FIG. 12 is a flowchart illustrating an optimal synthesis process of FIG. 2.

Next, the optimal synthesis process will be described with reference to a flowchart of FIG. 12.

In step S51, the binocular synthesizing unit 37 calculates a mixture ratio β for synthesizing the pixel of interest in the main image with the pixel in the sub image at a corresponding position, for example, by calculating the following Formula (6).

[Math. 6]

$$\beta = \frac{\sigma_{main}}{\sigma_{main} + \sigma_{sub}} \quad (6)$$

Here, $\sigma_{main}$ indicates a noise variance estimate value of the main image, $\sigma_{sub}$ indicates a noise variance estimate value of the sub image, and β indicates a mixture ratio between the pixel signal of the pixel of interest in the main image and the pixel signal of the pixel at the position corresponding to the pixel of interest in the sub image.

In step S52, the binocular synthesizing unit 37 synthesizes the pixel signal of the pixel of interest in the main image and the pixel signal of the pixel at the position corresponding to the pixel of interest in the sub image at the calculated mixture ratio β and calculates the optimal synthesis signal by calculating the following Formula (7).

[Math. 7]

$$P_{out} = P_{m,n}^m \times (1-\beta) + \beta \times P_{m,n}^s \quad (7)$$

The optimal synthesis is a technique of performing synthesis so that the SNR of the synthesized signal is maximized. In other words, in the optimal synthesis, synthesis when there is no parallax between the main image and the sub image, no blur, and no saturated pixel. In other words, it is synthesis in a situation in which an artifact or a false color does not occur even when a process of switching the sub image and the main image is performed.

Further, since the optimal synthesis process has no repetitive calculation, it is possible to reduce the computational amount as compared with the search synthesis process. Further, when the parallax determination process is performed in advance, it is possible to deal with only a pixel having a problem in the optimal synthesis process through the search synthesis process, and the remaining pixels are dealt with through the optimal synthesis process, and thus since it is unnecessary to apply the search synthesis process to all the pixels, it is possible to reduce the computational amount, and it is possible to perform the synthesis with the maximum SNR.

<Blend Synthesis Process Performed by Image Processing Device of FIG. 1>

Figure 13:
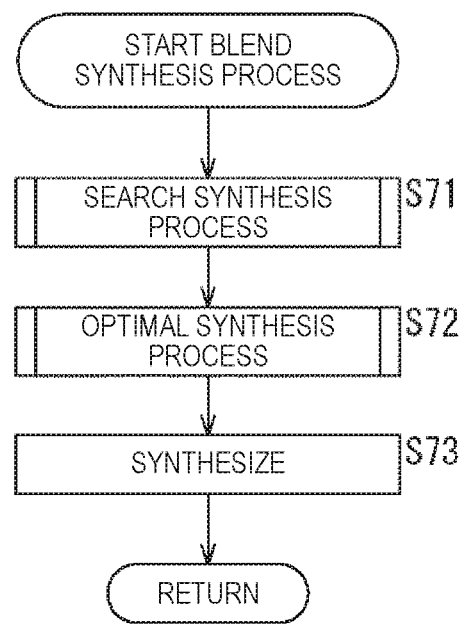
FIG. 13 is a flowchart illustrating a blend synthesis process of FIG. 2.

Next, the blend synthesis process will be described with reference to a flowchart of FIG. 13.

In step S71, the binocular synthesizing unit 37 generates a synthetic pixel by performing the search synthesis process with the corresponding pixel of the sub image on the pixel of interest of the main image. The search synthesis process is similar to the process described with reference to the flowchart of FIG. 8, and thus description thereof is omitted.

In step S72, the binocular synthesizing unit 37 generates a synthetic pixel by performing the optimal synthesis process with the corresponding pixel of the sub image on the pixel of interest of the main image. The optimal synthesis process is similar to the process described with reference to the flowchart of FIG. 12, and thus description thereof is omitted.

In step S73, the binocular synthesizing unit 37 mixes and synthesizes the pixel signal obtained by the search synthesis process and the pixel signal obtained by the optimal synthesis process using the determination value a as a mixture ratio and outputs a blend synthesis pixel. More specifically, the binocular synthesizing unit 37 synthesizes the pixel signal obtained by the search synthesis process and the pixel signal obtained by the optimal synthesis process, for example, using the determination value a as a mixture ratio through a calculation of the following Formula (8).

[Math. 8]

$$OUT = \alpha \times (OUT_{search}) + (1-\alpha) \times (OUT_{opt}) \qquad (8)$$

Here, OUT is the blend synthesis signal, $OUT_{search}$ indicates the pixel signal obtained by the search synthesis process, $OUT_{opt}$ indicates the pixel signal obtained by the optimal synthesis process, and a indicates the determination value (0<α<1).

Here, in a case in which the lower limit value th1 and the upper limit value th2 of the noise which are the threshold values for switching the determination value α are identical to each other, the optimal synthesis process and the search synthesis process are abruptly switched, and the pixels are synthesized by either the search synthesis process or the optimal synthesis process other than the blend synthesis process substantially.

Further, the process of causing the sub image to coincide with the main image and moving the sub image parallel by the parallax amount is performed only in a case in which the information for obtaining the parallax amounts of the optical systems of the high resolution imaging unit 31 and the high sensitivity imaging unit 33 is obtained, the parallel moving unit 35 may be omitted.

2. First Application Example

Figure 14:
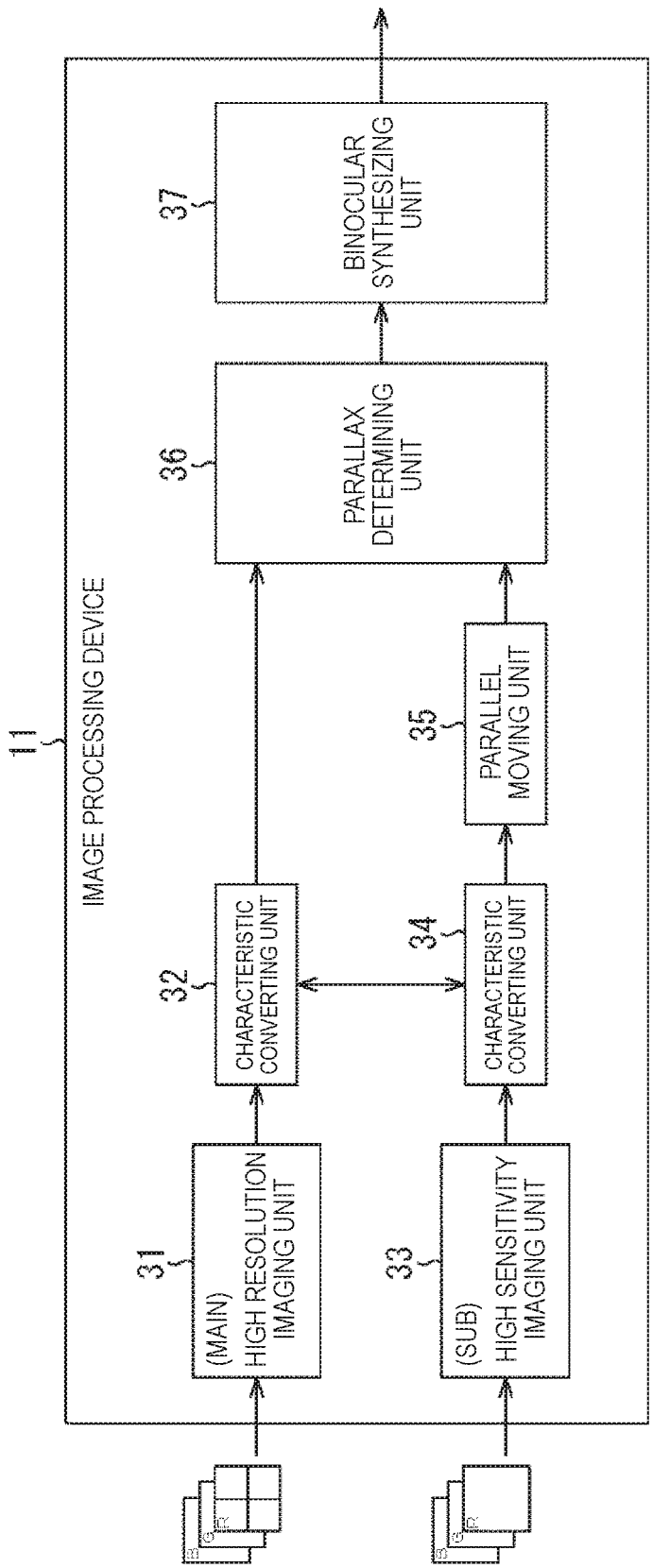
FIG. 14 is a diagram illustrating a first application example of an image processing device to which the present disclosure is applied.

In the above example, all the inputs of the main image and the sub image are the images of the Bayer array, but for example, as illustrated in FIG. 14, an image in which three colors of RGB are included in each of pixels in the main image and the sub image may be used. In this case, since a process is necessary for each image of RGB, the computational amount increases, but since a process is performed in a state in which each of the three colors of RGB is aligned for each pixel, the sensitivity of the main image can be further improved.

Further, in the above embodiment, the technique of performing synthesis in order to improve the SNR through the components with different sensitivities has been described, but it is possible to implement a high dynamic range (HDR) function by performing synthesis by compensating for the sensitivity difference of the signal value with the low sensitivity.

3. Second Application Example

Further, in the above example, the example in which the main image and the sub image have the same angle of view has been described, but the main image and the sub image need not have necessary the same angle of view and may be, for example, a wide-angle image and a telescopic image.

Figure 15:
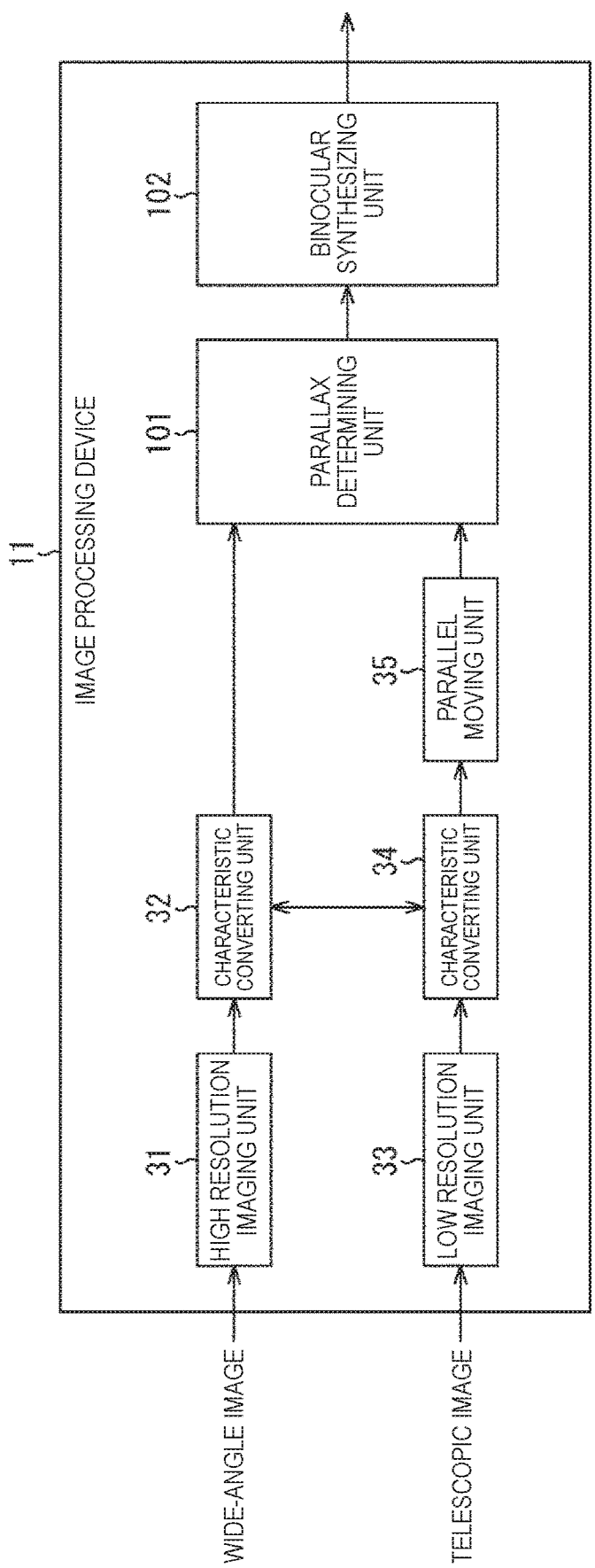
FIG. 15 is a diagram illustrating a second application example of an image processing device to which the present disclosure is applied.

In other words, as illustrated in FIG. 15, a wide-angle image may be input to the high resolution imaging unit 31 as the main image, and a telescopic image may be input to the high sensitivity imaging unit 33 as the sub image.

FIG. 15 illustrates a configuration example of an image processing device 11 in which a wide-angle image is input to the high resolution imaging unit 31 as the main image, and a telescopic image is input to the high sensitivity imaging unit 33 as the sub image. Here, in the image processing device 11 of FIG. 15, the same names and the same reference numerals are given to components having the same functions as those of the image processing device 11 of FIG. 1, and description thereof will be omitted appropriately.

In other words, the image processing device 11 of FIG. 15 is different from the image processing device of FIG. 1 in that a parallax determining unit 101 and a binocular synthesizing unit 102 are provided instead of the parallax determining unit 36 and the binocular synthesizing unit 37.

Basically, the parallax determining unit 101 has a function similar to that of the parallax determining unit 36 but further perform parallax determination of only pixels in a range in which the angle of view of the main image overlap the angle of view of the sub image out of the wide-angle image serving as the main image and the telescopic image serving as the sub image which are different in the angle of view.

The binocular synthesizing unit 102 extracts a high frequency component in the sub image in the region in which the angle of view of the wide-angle image serving as the main image overlaps the angle of view of the telescopic image serving as the sub image, and adds the high frequency component to a range serving as a region of the telescopic image in the wide-angle image, and thus an image in which a region corresponding to the telescopic image has a high resolution is obtained as the wide-angle image.

<Image Synthesis Process Performed by Image Processing Device of FIG. 15>

Figure 16:
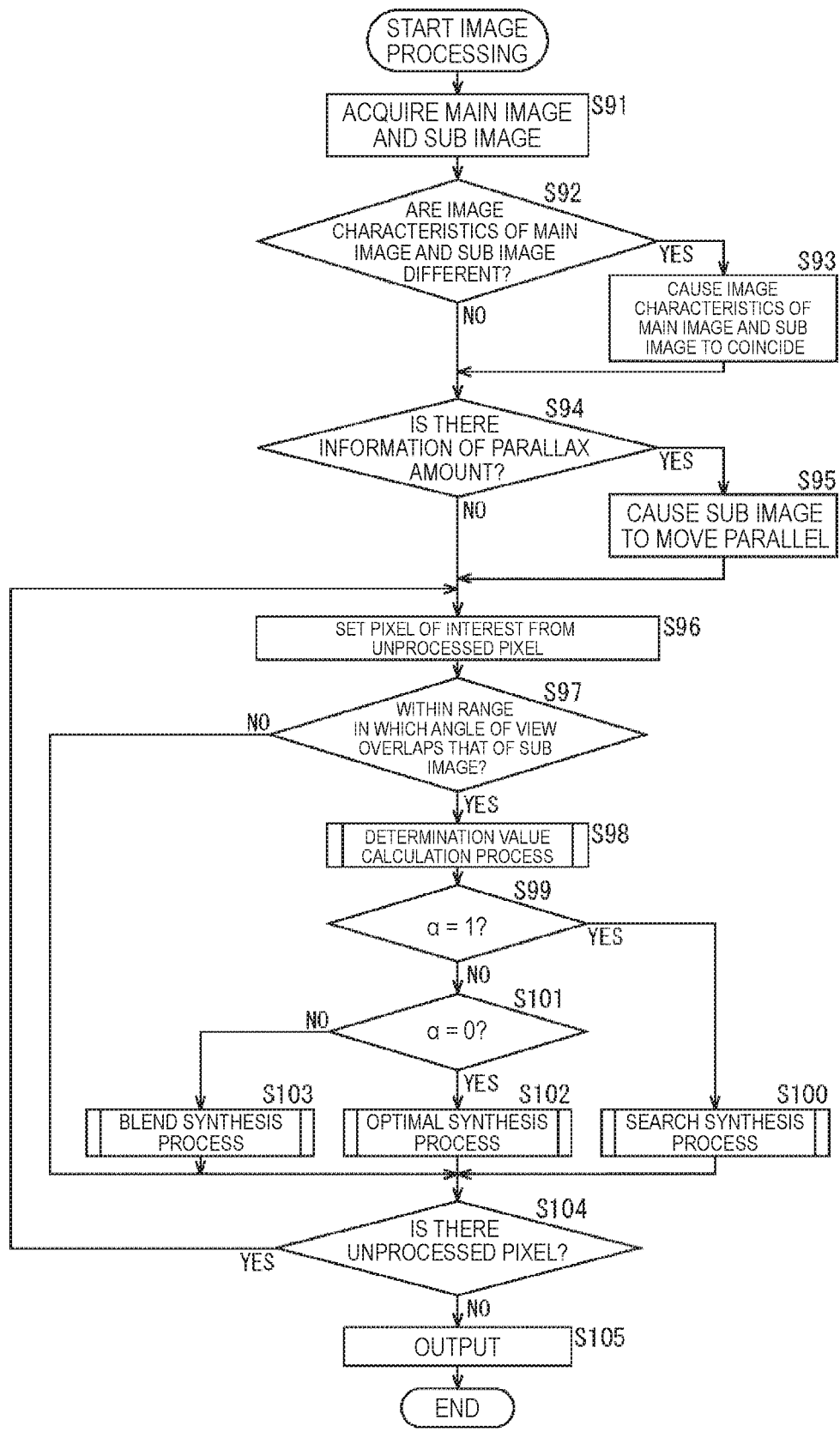
FIG. 16 is a flowchart illustrating image processing performed by the image processing device of FIG. 15.

Next, an image synthesis process performed by the image processing device of FIG. 15 will be described with reference to the flowchart of FIG. 16. Since a process of steps S91 to S95, S98, S99, S101, S104, and S105 in FIG. 16 are similar to the process of steps S11 to S15, S17, S18, S20, S23, and S24 in FIG. 2, and thus description thereof will be omitted appropriately.

In other words, in step S96, since a subsequent process is performed in units of pixels, the parallax determining unit 36 sets any one of unprocessed pixels as a pixel of interest serving as a processing target for the pixel positions of the main image.

In step S97, the parallax determining unit 36 determines whether or not the pixel of interest is a pixel in the angle of view in the sub image. In other words, here, since the main image is the wide-angle image, and the sub image is the telescopic image, the sub image becomes a part of the main image. For this reason, since a region which the angle of view of the main image and the angle of view of the sub image overlap can be processed, in order to exclude the other regions from the processing range, it is determined whether or not the pixel of interest is a pixel in the angle of view in the sub image. In step S97, in a case in which the pixel of interest is a pixel in the angle of view in the sub image, the process proceeds to step S98.

In step S98, the determination value calculation process is performed, and the determination value a for determining the presence or absence of the parallax between the pixel of interest which is the main image and the pixel of the sub image at the corresponding pixel position is calculated. Here, the determination value calculation process is similar to the process described with reference to the flowchart of FIG. 6, and thus description thereof is omitted here.

Then, in a case in which it is determined in step S99 that the determination value α is 1, and there is parallax, the process proceeds to step S100.

In step S100, the binocular synthesizing unit 101 executes the search synthesis process, searches for a pixel on the sub image similar to the pixel of interest, and adds the high frequency component of the searched pixel.

In other words, when the determination value α is 1, it means that since the pixel of interest on the main image is not identical to the pixel of the sub image at the same position due to the parallax, the process of searching for a pixel on the sub image similar to the pixel of interest and using the searched pixel on the sub image is necessary.

<Search Synthesis Process Performed by Image Processing Device of FIG. 15>

Figure 17:
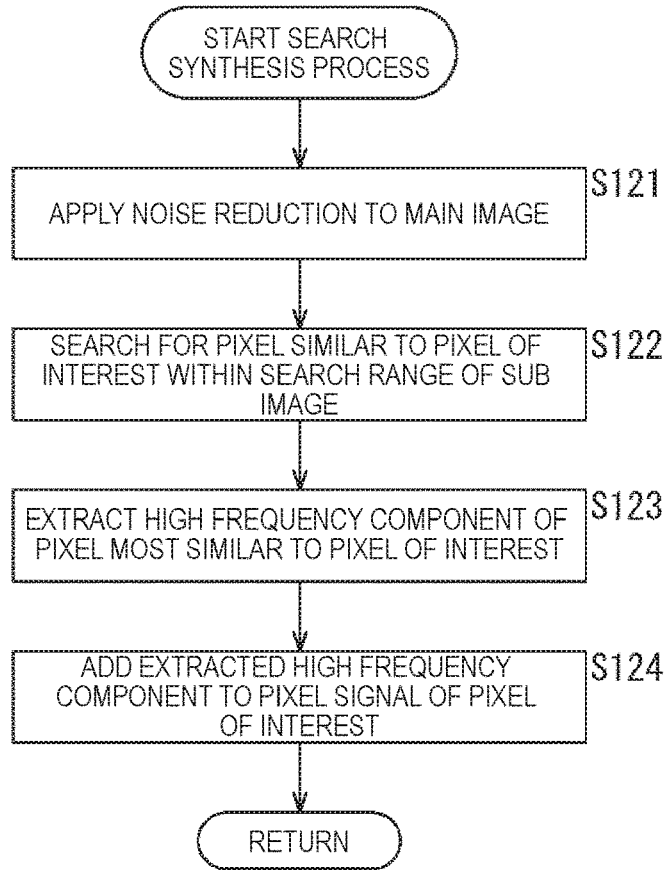
FIG. 17 is a flowchart illustrating a search synthesis process of FIG. 16.

Here, a search synthesis process performed by the image processing device 11 of FIG. 15 will be described with reference to a flowchart of FIG. 17.

In step S121, in order to improve a SNR of the main image, the binocular synthesizing unit 102 searches for a predetermined range centering on the pixel of interest, for example, a range of 3×3 pixels and applies noise reduction. This process is similar to the process of step S41 in FIG. 8 described above.

In step S122, the binocular synthesizing unit 102 searches for a pixel which is most similar to the current pixel of interest in the sub image within the search range. Here, examples of the pixel on the sub image which is most similar to the pixel of interest include a weighted average corresponding to a weight of a degree of similarity between pixels and a difference absolute value sum between pixels in the range of 3×3 pixels centering on the pixel of interest and the searched pixel, respectively.

In step S123, the binocular synthesizing unit 102 extracts the high frequency component of the pixel on the sub image having the highest degree of similarity to the pixel of interest.

In step S124, the binocular synthesizing unit 102 adds the extracted high frequency component to the pixel value of the pixel of interest and stores it as a synthesis result.

In other words, with such a process, the pixel having the high degree of similarity in the sub image is searched for the pixel regarded as having parallax in the main image, and it is possible to reduce influence of the parallax and add the high frequency component of the sub image to the pixel of the same angle of view region as the sub image in the main image.

Here, the description returns to FIG. 16.

On the other hand, in a case in which the determination value α is 0 in step S101, it is regarded that no parallax occurs between the pixel of interest on the main image and the pixel on the corresponding sub image, and thus the process proceeds to step S102, and the optimal synthesis process is performed, and the high frequency component in the sub image at the corresponding position is added to the pixel value of the pixel of interest.

<Optimal Synthesis Process Performed by Image Processing Device of FIG. 15>

Figure 18:
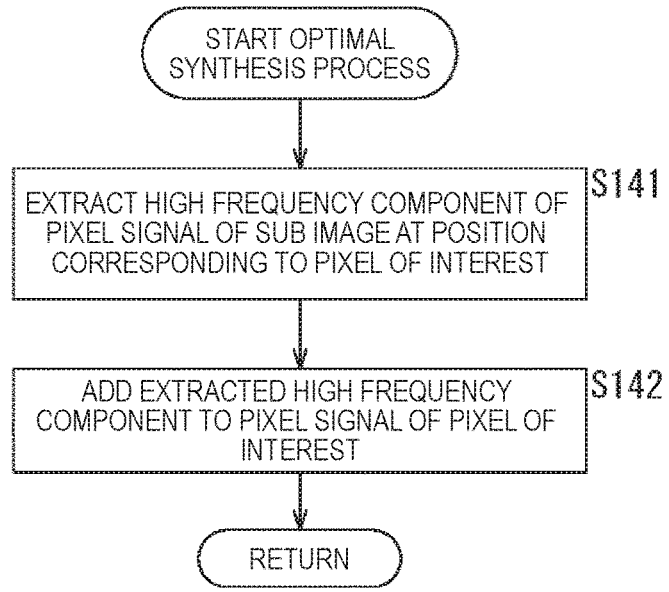
FIG. 18 is a flowchart illustrating an optimal synthesis process of FIG. 16.

Here, an optimal synthesis process by the image processing device of FIG. 15 will be described with reference to the flowchart of FIG. 18.

In step S141, the binocular synthesizing unit 102 extracts the high frequency component of the pixel of the sub image at the position corresponding to the pixel of interest in the main image.

In step S142, the binocular synthesizing unit 102 adds the extracted high frequency component of the pixel of the sub image at the position corresponding to the pixel of interest to the pixel value of the pixel of interest in the main image and stores the resulting pixel value.

With the above processing, the pixel of interest on the main image and the pixel on the sub image at the corresponding position are regarded as having no parallax, and the high frequency component of the pixel on the sub image is added to the pixel of interest without change.

Here, the description returns to the flowchart of FIG. 16.

Further, in a case in which the determination value α is within the range of 0 to 1, in step S103, the blend synthesis process is executed, and the pixel to which the high frequency component is added by the search synthesis process and the pixel to which the high frequency component is added through the optimal synthesis process are blended at the mixture ratio using the determination value α. Since this process is similar to as the process described with reference to the flowchart of FIG. 13, description thereof is omitted.

Then, in a case in which the pixel of interest is determined to be out of the angle of view of the sub image in step S97, the process proceeds to step S104. In other words, in this case, the pixel of interest does not undergo the process and is stored without change. Further, of all the pixels of the main image have been processed, in step S105, an image including the pixel values stored by the binocular synthesizing unit 102 is output.

As a result, since the high frequency component of the sub image is added to the region of the sub image which is the telescopic image in the main image which is the wide-angle image, an image in which the region corresponding to the telescopic image has a high resolution is obtained as the wide-angle image.

Here, any other combination of the main image and the sub image is possible, and for example, the main image may be a Bayer image, and the sub image may be a monochrome image, or the main image may be a Bayer image, and the sub image may be a near infrared image.

In other words, it is possible to acquire the high resolution synthesis result by using an image captured by a Bayer array sensor as the main image and using an image captured by a monochrome sensor as the sub image. In the case of this configuration, since the same optical system can be used in the main image and the sub image, it is possible to perform synthesis in the entire angle of view.

The monochrome image sensor has a feature in that luminance is a high resolution, and a sensitivity is high as compared with the Bayer array sensor. As a result, the synthetic images can have the high resolution effect and the improved SNR.

Further, since the main image is captured through the Bayer array sensor, and the near infrared image of the sub image is captured through the sensor having the sensitivity, it is possible to synthesize an image which is unable to be captured by visible light with the main image. It is possible to image hemoglobin in the blood.

By separating the region having parallax from the region having no parallax, it is possible to switch the process in accordance with the presence/absence of parallax and reduce the computational amount.

Further, when the calculation range of the search of the main image and the sub image is set to a range in which a direction vertical to a parallax direction is decreased, and a parallel direction is increased, it is possible to improve the image quality while suppressing the computational amount.

By minimizing parallax of a region of interest, it is possible to perform synthesis while maximizing the characteristic.

Further, in the above example, the example of obtaining the determination value for determining the presence or absence of parallax in units of pixels has been described, but for example, the entire image may be divided into a plurality of regions in units of pixels, the presence or absence of parallax may be determined for each of the divided regions other than units of pixels, the determination value may be obtained, and the synthesis may be performed in units of regions.

Further, in the above example, the operation in the parallel moving unit 35 has been described with the example in which the information necessary for obtaining the parallax such as the optical characteristic such as a distance to the focal plane of the high resolution imaging unit 31 and the high sensitivity imaging unit 33, and the parallel movement is performed by the parallax amount obtained in accordance with the distance to the focal plane, the arrangement, the optical characteristic, and the resolution, but any other method can be used as long as the parallel movement is performed so that the parallax can be reduced, and for example, it is possible to reduce the parallax by performing the parallel movement by a parallax amount obtained with reference to a table preset from a setting value obtained by adjusting a focal distance of one imaging unit, a parallax amount obtained as a deviation between common feature points of two images, or a parallax amount obtained in accordance with a depth when a depth map corresponding to each of the two images is given, or a preset predetermined parallax amount.

<Example of Execution by Software>

Incidentally, the above series of processes can, for example, be executed by hardware, or can be executed by software. In the case where the series of processes is executed by software, a program configuring this software is installed in a computer included in dedicated hardware, or a general-purpose personal computer which can execute various functions when various programs are installed, etc., from a recording medium.

Figure 19:
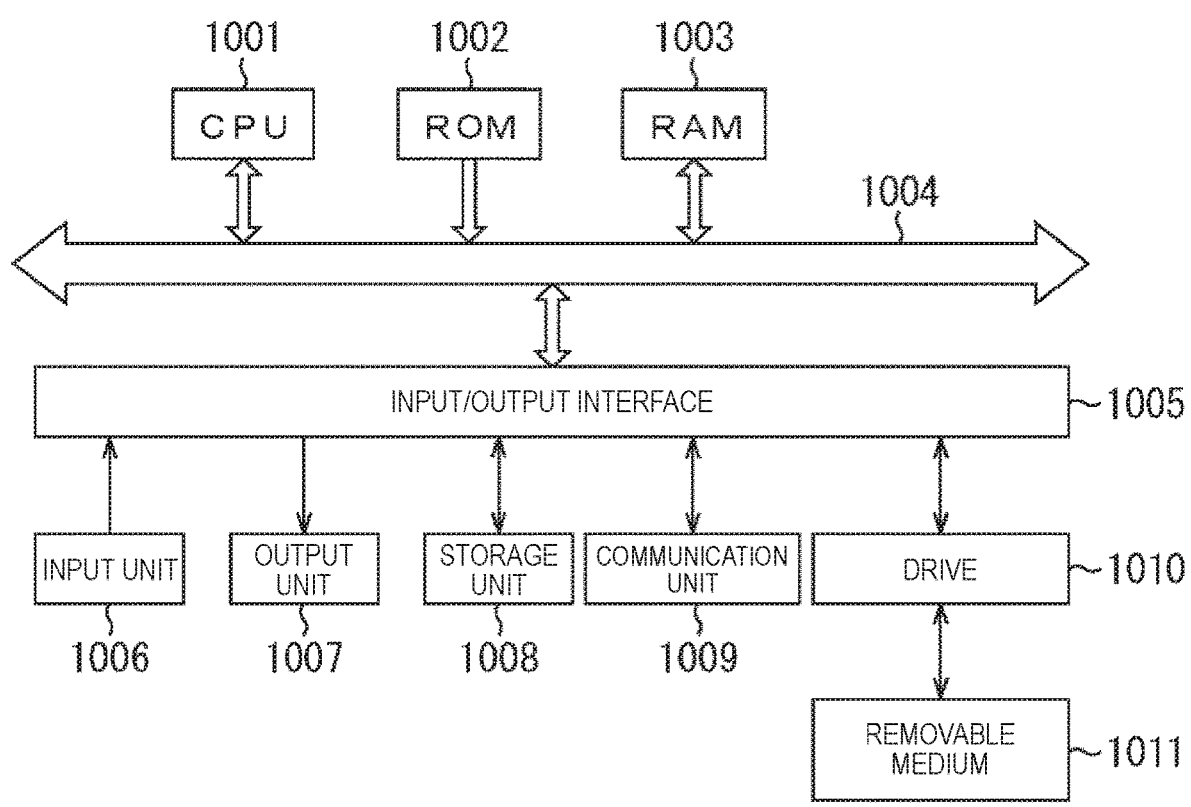
FIG. 19 is a diagram illustrating a configuration example of a general-purpose personal computer.

FIG. 19 shows an example configuration of a general-purpose personal computer. The computer includes a CPU (Central Processing Unit) 1001. An input/output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a LAN (Local Area Network) adaptor etc. which performs a communication process through a network typified by the Internet, are connected to the input/output interface 1005. Also, connected is a drive 1010 which reads and writes data from and to a removable medium 1011, such as a magnetic disk (including a flexible disk), an optical disk (including a CD-ROM (Compact Disc-Read Only Memory) and a DVD (Digital Versatile Disc)), an magneto-optical disk (including an MD (Mini Disc)), or a semiconductor memory, etc.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which is necessary when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004, and executes the program. Thus, the above-described series of processing is performed.

Programs to be executed by the computer (the CPU 1001) are provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the program can be received by the communication unit 1009 via a wired or wireless transmission medium and installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

<1>
An image processing device, including:
a first imaging unit configured to capture a first image;
a second imaging unit configured to capture a second image;
a parallax determining unit configured to determine whether there is parallax between the first image and the second image; and
a synthesizing unit configured to synthesize respective pixels of the first image and the second image in accordance with a determination result of the parallax determining unit.

<2>
The image processing device according to <1>, in which the first imaging unit and the second imaging unit are on a same plane, and optical axes of the first imaging unit and the second imaging unit are parallel.

<3>
The image processing device according to <1> or <2>, in which the first image and the second image have different image characteristics.

<4>
The image processing device according to <3>, in which the first image and the second image are different in the image characteristic of at least one of a number of pixels, an angle of view, a wavelength band, and a color filter array.

<5>
The image processing device according to any one of <1> to <4>, in which the parallax amount determining unit determines whether there is parallax in units of pixels of the first image and the second image or in units of regions divided into a plurality of regions including a plurality of pixels.

<6>
The image processing device according to any one of <1> to <5>, in which, in a case in which the parallax determining unit determines that there is no parallax, the synthesizing unit synthesizes pixels of the first image and the second image at corresponding positions, and
in a case in which the parallax determining unit determines that there is parallax, the synthesizing unit searches for pixels in the second image similar to respective pixels of the first image and synthesizes the respective pixels with the searched pixels.

<7>
The image processing device according to any one of <1> to <6>, further including
a characteristic adjusting unit configured to adjust characteristics of the first image and the second image to make the characteristics coincide with each other,
in which the parallax determining unit determines whether there is parallax for the first image and the second image whose characteristics are adjusted to coincide with each other by the characteristic adjusting unit.

<8>
The image processing device according to any one of <1> to <7>, in which the characteristic adjusting unit performs adjustment so that the first image and the second image coincide in at least one of a resolution, a sensitivity, a spatial frequency characteristic, a direction of an optical axis, and a parallelization process of correcting lens distortion.

<9>
The image processing device according to any one of <1> to <8>, further including
a parallel moving unit configured to cause the second image to move parallel relative to the first image to reduce parallax,
in which the parallel moving unit causes the entire second image to move parallel or causes the second image to move parallel in units of pixels to reduce the parallax.

<10>
The image processing device according to <9>, in which the parallel moving unit causes the entire second image to move parallel or causes the second image to move parallel in units of pixels by a parallax amount obtained in accordance with a distance from the first imaging unit to the focal plane and an arrangement, optical characteristics, and resolutions of the first imaging unit and the second imaging unit, a parallax amount obtained with reference to a table preset from a setting value obtained by adjusting a focal distance of the first imaging unit, a parallax amount obtained as a deviation between common feature points of the first image and the second image, a parallax amount obtained in accordance with a depth when a depth map corresponding to each of the first image and the second image is given, or a preset predetermined parallax amount.

<11>
An image processing method, including steps of:
capturing a first image;
capturing a second image;
determining whether there is parallax between the first image and the second image; and
synthesizing respective pixels of the first image and the second image in accordance with a determination result of the parallax.

<12>
A program causing a computer to function as:
a first imaging unit configured to capture a first image;
a second imaging unit configured to capture a second image;
a parallax determining unit configured to determine whether there is parallax between the first image and the second image; and
a synthesizing unit configured to synthesize respective pixels of the first image and the second image in accordance with a determination result of the parallax determining unit.

REFERENCE SIGNS LIST 11 image processing device
31 high resolution imaging unit
32 characteristic converting unit
33 high sensitivity imaging unit
34 characteristic converting unit
35 parallel moving unit
36 parallax determining unit
37 binocular synthesizing unit

The invention claimed is:
1. An image processing device, comprising:
a first image sensor configured to capture a first image;
a second image sensor configured to capture a second image, wherein
the first image sensor and the second image sensor are on a same plane, and
optical axes of the first image sensor and the second image sensor are parallel; and
a central processing unit (CPU) configured to:
determine whether there is parallax between the first image and the second image; and synthesize respective pixels of the first image and the second image based on a result of the determination of the parallax.

2. The image processing device according to claim 1, wherein
the first image and the second image have different image characteristics.

3. The image processing device according to claim 2, wherein the first image and the second image are different in an image characteristic of at least one of a number of pixels, an angle of view, a wavelength band, or a color filter array.

4. The image processing device according to claim 1, wherein
the CPU is further configured to determine whether there is parallax in units of pixels of the first image and the second image or in units of regions divided into a plurality of regions including a plurality of pixels.

5. The image processing device according to claim 1, wherein
based on a determination that there is no parallax, the CPU is further configured to synthesize pixels of the first image and the second image at corresponding positions, and
based on a determination that there is parallax, the CPU is further configured to:
search for pixels in the second image similar to respective pixels of the first image; and
synthesize the respective pixels with the searched pixels.

6. The image processing device according to claim 1, wherein the CPU is further configured to:
adjust characteristics of the first image and the second image to make the characteristics coincide with each other; and
determine whether there is parallax for the first image and the second image whose characteristics are adjusted to coincide with each other.

7. The image processing device according to claim 6, wherein
the CPU is further configured to adjust the characteristics of the first image and the second image to make the characteristics coincide in at least one of a resolution, a sensitivity, a spatial frequency characteristic, a direction of an optical axis, or a parallelization process of correcting lens distortion.

8. The image processing device according to claim 1, wherein
the CPU is further configured to move the second image parallel relative to the first image to reduce the parallax, and
the entire second image is moved parallel or the second image is moved parallel in units of pixels to reduce the parallax.

9. The image processing device according to claim 8, wherein
the CPU is further configured to move the entire second image parallel or move the second image to move parallel in units of pixels by one of a first parallax amount, a second parallax amount, a third parallax amount, a fourth parallax amount, or a determined parallax amount,
the first parallax amount is obtained based on a distance from the first image sensor to a focal plane and an arrangement, optical characteristics, and resolutions of the first image sensor and the second image sensor, the second parallax amount is obtained with reference to a table preset from a setting value obtained based on adjustment of a focal distance of the first image sensor,
the third parallax amount is obtained as a deviation between common feature points of the first image and the second image, and
the fourth parallax amount is obtained based on a depth when a depth map corresponding to each of the first image and the second image is given.

10. An image processing method, comprising:
capturing a first image by a first image sensor;
capturing a second image by a second image sensor, wherein
the first image sensor and the second image sensor are on a same plane, and
optical axes of the first image sensor and the second image sensor are parallel;
determining whether there is parallax between the first image and the second image; and
synthesizing respective pixels of the first image and the second image based on a result of the determination of the parallax.

11. A non-transitory computer-readable medium having stored thereon, computer-executable instructions which, when executed by a computer, cause the computer to execute operations, the operations comprising:
capturing a first image by a first image sensor;
capturing a second image by a second image sensor, wherein
the first image sensor and the second image sensor are on a same plane, and
optical axes of the first image sensor and the second image sensor are parallel;
determining whether there is parallax between the first image and the second image; and
synthesizing respective pixels of the first image and the second image based on a result of the determination of the parallax.

12. An image processing device, comprising:
a first image sensor configured to capture a first image;
a second image sensor configured to capture a second image; and
a central processing unit (CPU) configured to:
determine whether there is parallax in units of pixels of the first image and the second image or in units of regions divided into a plurality of regions including a plurality of pixels; and
synthesize respective pixels of the first image and the second image based on a result of the determination of the parallax.

13. An image processing device, comprising:
a first image sensor configured to capture a first image;
a second image sensor configured to capture a second image; and
a central processing unit (CPU) configured to:
determine whether there is parallax between the first image and the second image; and
synthesize respective pixels of the first image and the second image based on a result of the determination of the parallax, wherein
based on the determination that there is no parallax, the CPU is further configured to synthesize pixels of the first image and the second image at corresponding positions, and
based on the determination that there is parallax, the CPU is further configured to:

search for pixels in the second image similar to respective pixels of the first image; and synthesize the respective pixels with the searched pixels.

14. An image processing device, comprising:

a first image sensor configured to capture a first image;

a second image sensor configured to capture a second image; and a central processing unit (CPU) configured to:

adjust characteristics of the first image and the second image to make the characteristics coincide with each other;

determine whether there is parallax between the first image and the second image whose characteristics are adjusted to coincide with each other; and synthesize respective pixels of the first image and the second image based on a result of the determination of the parallax.

15. An image processing device, comprising:

a first image sensor configured to capture a first image;

a second image sensor configured to capture a second image; and a central processing unit (CPU) configured to:

determine whether there is parallax between the first image and the second image;

move the second image parallel relative to the first image to reduce the parallax, wherein the entire second image is moved parallel or the second image is moved parallel in units of pixels to reduce the parallax; and synthesize respective pixels of the first image and the second image based on a result of the determination of the parallax.

* * * * *